United States Patent

[11] 3,557,931

| [72] | Inventor | John Fernandez<br>453 Glenbrook Road, Stamford, Conn.<br>06906 |
|---|---|---|
| [21] | Appl. No. | 716,137 |
| [22] | Filed | Mar. 26, 1968 |
| [45] | Patented | Jan. 26, 1971 |

[54] ARTICLE TRANSFER APPARATUS
12 Claims, 11 Drawing Figs.

[52] U.S. Cl. .................................................. 198/20,
198/1; 214/16.1
[51] Int. Cl. .................................................. B65g 47/52
[50] Field of Search .......................................... 198/1, 129,
110, 124, 125, 126, 183, 20; 214/16.11, 16.14F

[56] References Cited
UNITED STATES PATENTS
1,782,671 11/1930 Allred ........................(214/16.11UX)
1,969,002 8/1934 Gleichman .................. 214/16.1(4F)

FOREIGN PATENTS
984,275 2/1965 Great Britain................ 214/16.11

*Primary Examiner*—Hugo O. Schulz
*Attorney*—John W. Hoag

ABSTRACT: An article transfer means for articles of any kind, which may or may not be free to roll, and particularly for large bulky articles such as storage containers, automobiles and the like for receiving a load from any one of four directions and delivering it in any of four directions. A load-supporting member or pad is associated with two angularly related flexible means in such a way that the pad may be selectively moved with one or the other of said means, along an endless path, over and partly around a supporting structure or frame in either direction. The assembly of pad and supporting frame are mounted on a base and may be slid or "thrown" a short distance relative to the base, in any of four directions, toward and away from another surface, from or to which a load is to be received or delivered.

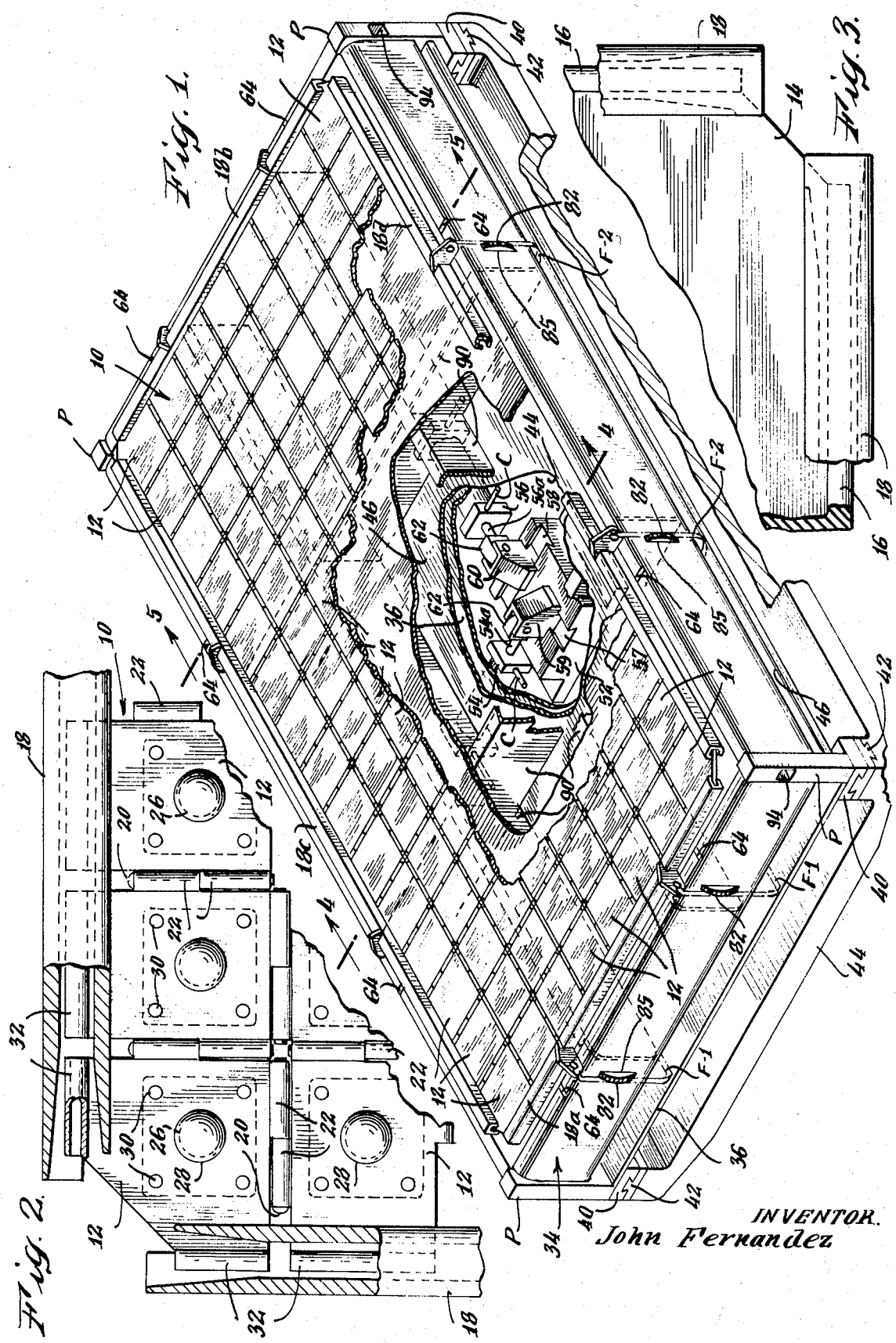

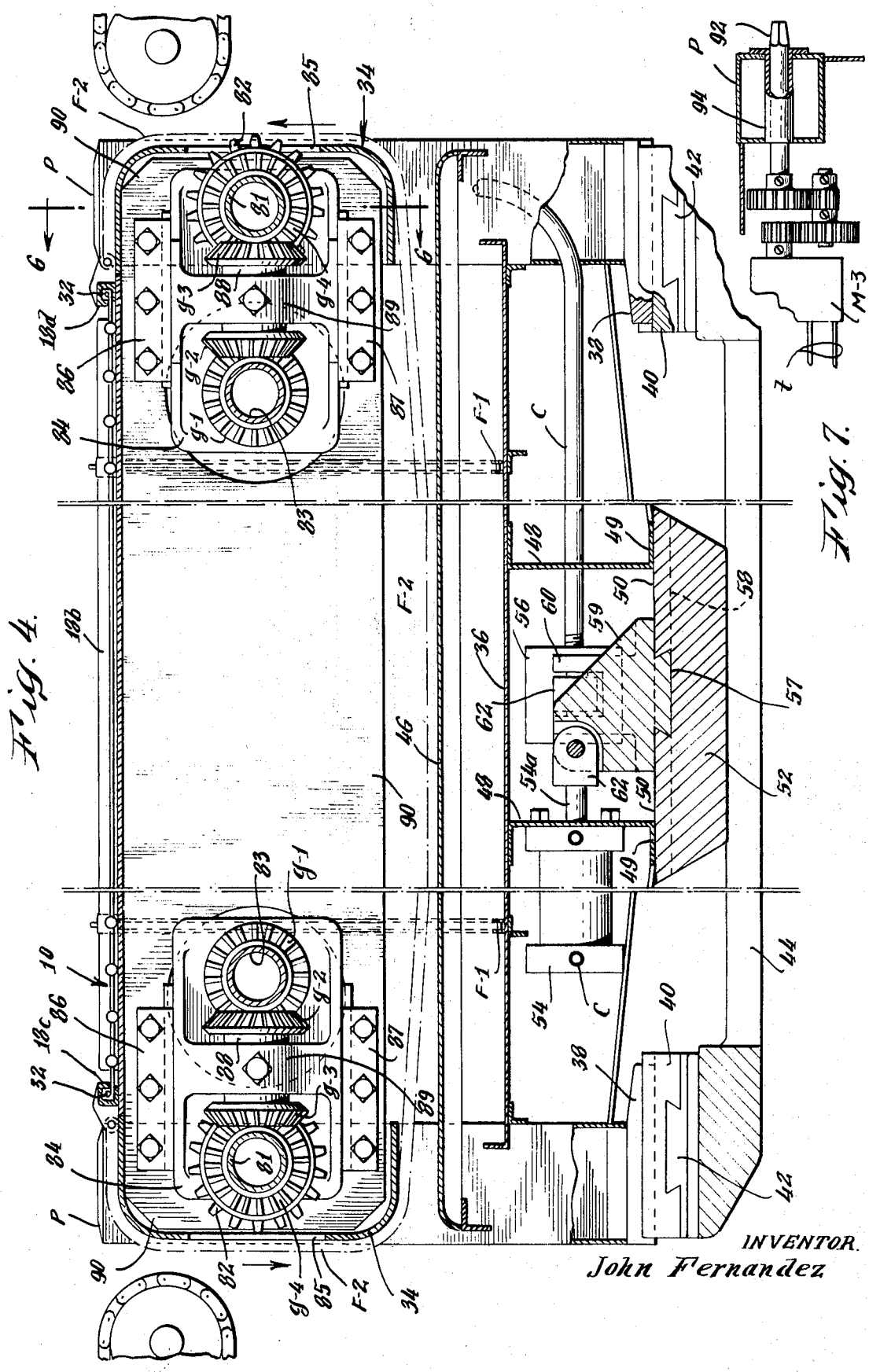

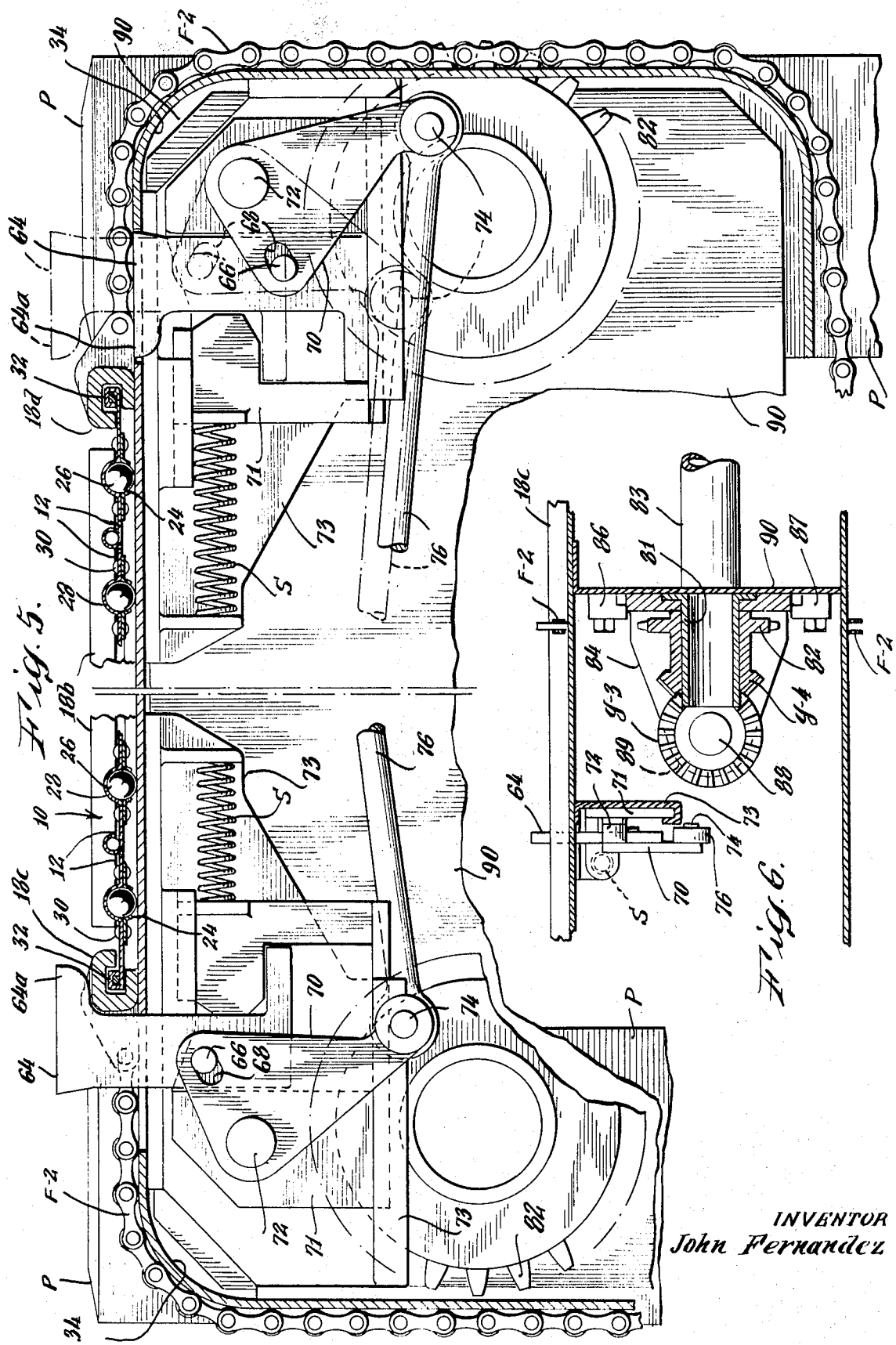

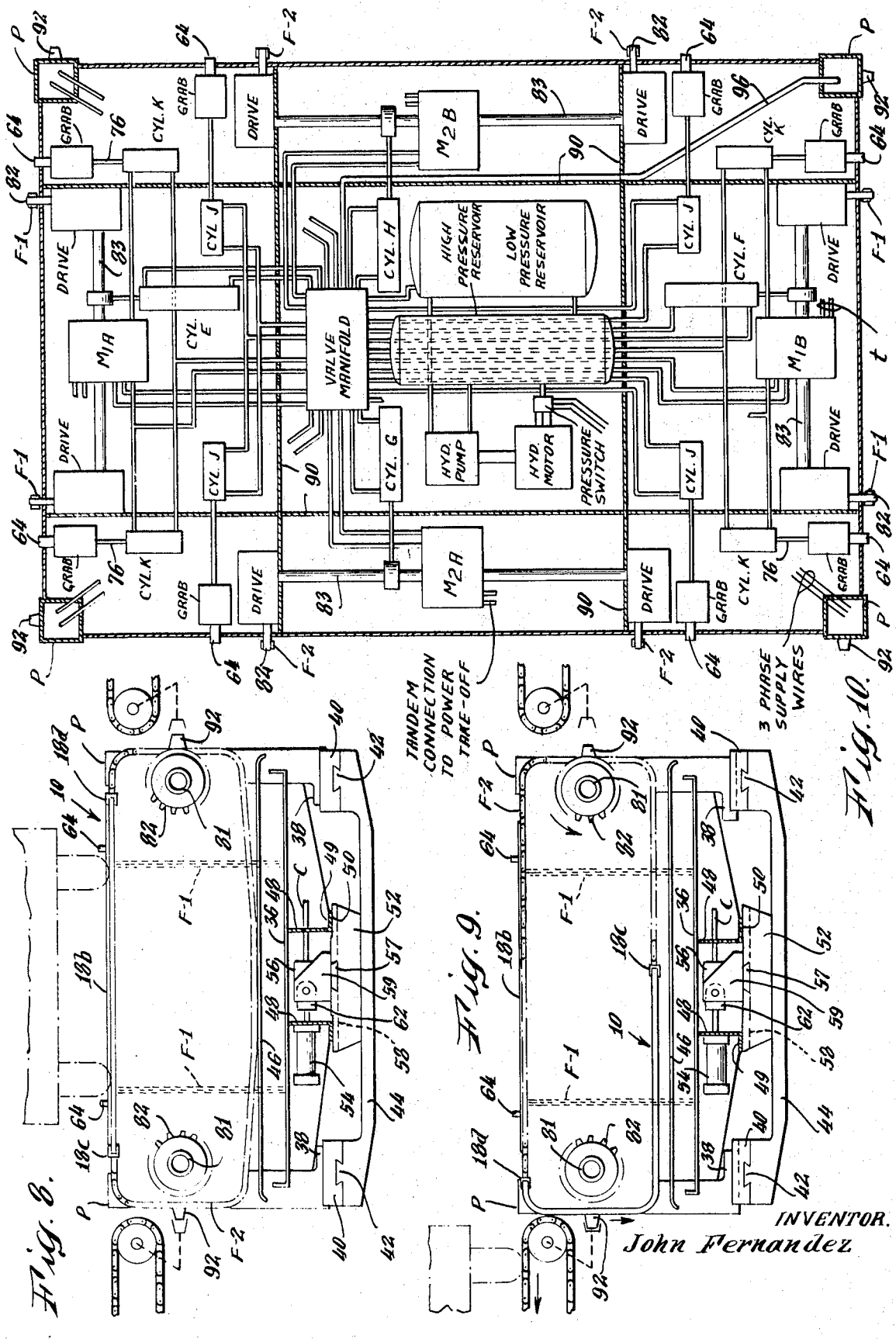

INVENTOR.
John Fernandez

ARTICLE TRANSFER APPARATUS

BACKGROUND OF THE INVENTION

1. Field of the Invention

This invention relates to the transfer of articles, from one carrier to another carrier, or exchanges into or from storage, or to change the orientation of an article as by receiving it broadside and delivering it endwise or visa versa.

2. Description of the Prior Art

Various prior art transfer means are known such as turn tables, ship to shore loading and unloading means, and conveyors and combinations of conveyors. Perhaps the most pertinent apparatus for receiving articles from one direction and delivering them in another direction is that disclosed in my copending U.S. Pat. application Ser. No. 620,315, for Conveyor Systems, filed Mar. 3, 1967, now U.S. Pat. No. 3,451,526. The present invention is a further development of that apparatus, intended particularly for large, bulky articles such as storage containers, automobiles and the like.

SUMMARY

A load-supporting member or pad is associated with two angularly related flexible means and may be selectively moved with one or the other of said means along an endless path over and partly around a supporting structure or frame in either direction. Opposed peripheral edge portions of the load-supporting member or pad are associated with attachment means herein referred to as "draw bars," disposed at the respective ends of the two angularly related flexible means each of which may comprise a plurality of flexible members such as chains, mesh belts, and the like. When the load supporting member or pad is moved in one direction by means of one of said flexible means it is slidingly related to the other of said flexible means which remains stationary.

In order to lessen the distance, between the pad and a surface to or from which a load is to be transferred, that may be required for example for clearance between the surface and a transfer assembly while one or both are moving to or from operatively related position, the transfer assembly, including the pad and the frame around which it moves, may be slidingly related to a supporting chassis or truck or other base so that, besides moving with a truck or chassis base, the pad and its supporting frame may be moved on the base, and relative to the base, toward or away from an opposed receiving or delivering surface. If, the transfer assembly is to receive a large, bulky article, the transfer assembly or the surface on which the article is supported is moved to bring the two into operative relation, the pad is rotated around its supporting and guiding frame toward the other surface on which the article is disposed, and the transfer assembly is then "thrown" or moved on, and, in relation to, its base, toward the said surface in order to lessen the distance between them, and to compensate for the clearance required between them while one or both are moving into operative relation. The pad is then rotated back around its frame, away from the other surface, drawing the load as its weight is transferred from the other surface, as for example by the movement of the other surface if it is a conveyor or comprises pipe rolls, etc. The transfer assembly is then slid or "thrown" back to its initial position in relation to its base.

Desirably all the operations of the device are automatic and the power means, which may be hydraulic or electrical for example, may be housed within the frame and controlled as by push buttons from a conveniently located console. If desired the power means employed to rotate or otherwise actuate a drive member adapted to mate with coacting drive means carried by an opposed load-delivering or -receiving surface, such as a conveyor, so that the conveyor can be actuated and rotated to either receive the load from the transfer assembly pad or to discharge a load onto the load-carrying surface. To facilitate the mating of said coacting drive members this result may be accomplished simultaneously with sliding the transfer assembly on its base in the direction of the opposed load-receiving or load-discharging conveyor.

It should be noted that it makes no difference whether a load, such as an automobile, is received onto the transfer assembly pad endwise or sidewise. It may be delivered from the pad sidewise or endwise as desired. In used process of transfer the orientation of the load may be changed. The apparatus may be usefully employed in a great variety of ways and in a great variety of places. It may for example be used to receive goods brought to it on one direction on a conveyor and to thereafter discharge the goods onto another conveyor disposed in a plane angularly related to the plane of the first conveyor. The transfer assembly may be supported on a chassis which can be employed to carry the assembly to a loading place, or to a discharging place. It may be used to take a load from storage or deliver it into storage. The "storage" space may, for example, be in a warehouse, garage, a freight car or a ship. In addition to transferring articles from one place to another on the same level the load-carrying may be employed with elevator means to receive or discharge articles at one level and to discharge or receive articles at a different level.

An object of the invention is to provide means for facilitating the transfer of a load from one carrier to another, or from one place to another place, as for example the transfer of a load to and from storage or a parking area.

Another object of the invention is to provide load transfer means capable of receiving a load from any one of four angularly related directions and delivering the load in any one of four angularly related directions, thereby eliminating the necessity for turning or maneuvering space.

Another object of the invention is to provide load transfer means having a load-carrying portion which is itself movable relative to its base in any of several different directions to lessen the distance between itself and an opposing load-receiving or -discharging surface, and which is capable of coacting with an opposed conveyor means to provide for transferring loads without requiring any manual effort.

BRIEF DESCRIPTION OF THE DRAWING

FIG. 1 is an isometric view of transfer means employing the invention;

FIG. 2 is a detail view partly cut away and in cross section showing a load-supporting member or pad comprising a number of units hinged together along their lateral edges for making the pad flexible both longitudinally and laterally, and having along its edges rodlike portions of increased thickness which are longitudinally slidable within draw bars positioned along each lateral edge of the pad and connected to flexible means such as chains, ropes and the like by which the draw bars can be drawn over and around a boxlike supporting surface which provides a base over and around which the load-supporting member or pad is moved in any one of four directions;

FIG. 3 is a detail view of a load-supporting member or pad similar in purpose to the one shown in FIG. 2 but consisting of a unitary flexible member which may be of any suitable tough, durable composition;

FIG. 4 is a vertical sectional view taken on the lines 4—4 of FIG. 1 showing means by which the flexible members attached to the draw bars may be engaged and driven, and also showing that the pad-supporting assembly may be moved a short distance in any of four directions relative to a supporting base member;

FIG. 5 is a cross-sectional view taken on the lines 5—5 of FIG. 1, on a somewhat enlarged scale showing means, referred to herein as "grabs" or "clasps," which are first elevated, and then moved in behind a draw bar to hold it in position when the pad is being moved longitudinally of the draw bar at which time the edge portions of the pads which are within the laterally disposed draw bars will slide longitudinally through and out of the draw bars;

FIG. 6 is a detail vertical sectional view taken on the lines 6—6 of FIG. 4;

FIG. 7 is a detail horizontal view partly in section, showing means driven by the hydraulic system and extending through a corner post, to impart drive to an opposed coacting conveyor;

FIG. 8 is a schematic view showing a vehicle being supported on the supporting member or pad of a transfer assembly and means are indicated on either side of the transfer assembly which represent another surface, such as a conveyor, onto which it may be desired to transfer the vehicle;

FIG. 9 is a view similar to FIG. 8 but showing the transfer assembly after it has been moved on its base toward the article receiving means on the left side of the transfer assembly, as viewed by the reader, and after the article supporting member or pad has been rotated counterclockwise a distance substantially the width or length of the pad, as the case may be, during which operation the supported article has been transferred from the pad to the left-hand supporting surface;

FIG. 10 is a top plan view looking into the interior of the boxlike frame around which the load-supporting member or pad is guided, and showing an hydraulic system by which is accomplished, the movement of the supporting pad in any one of four directions, the movement of the "grab" members, the energization of means located below the frame (shown in FIG. 1) for movement of the whole main body of the transfer assembly relative to its base, and the actuation of drive means (shown in FIG. 7) for coaction with drive means extending from a conveyor assembly, onto or from which the load is to be moved.

DESCRIPTION OF THE PREFERRED EMBODIMENT

Figure 11:
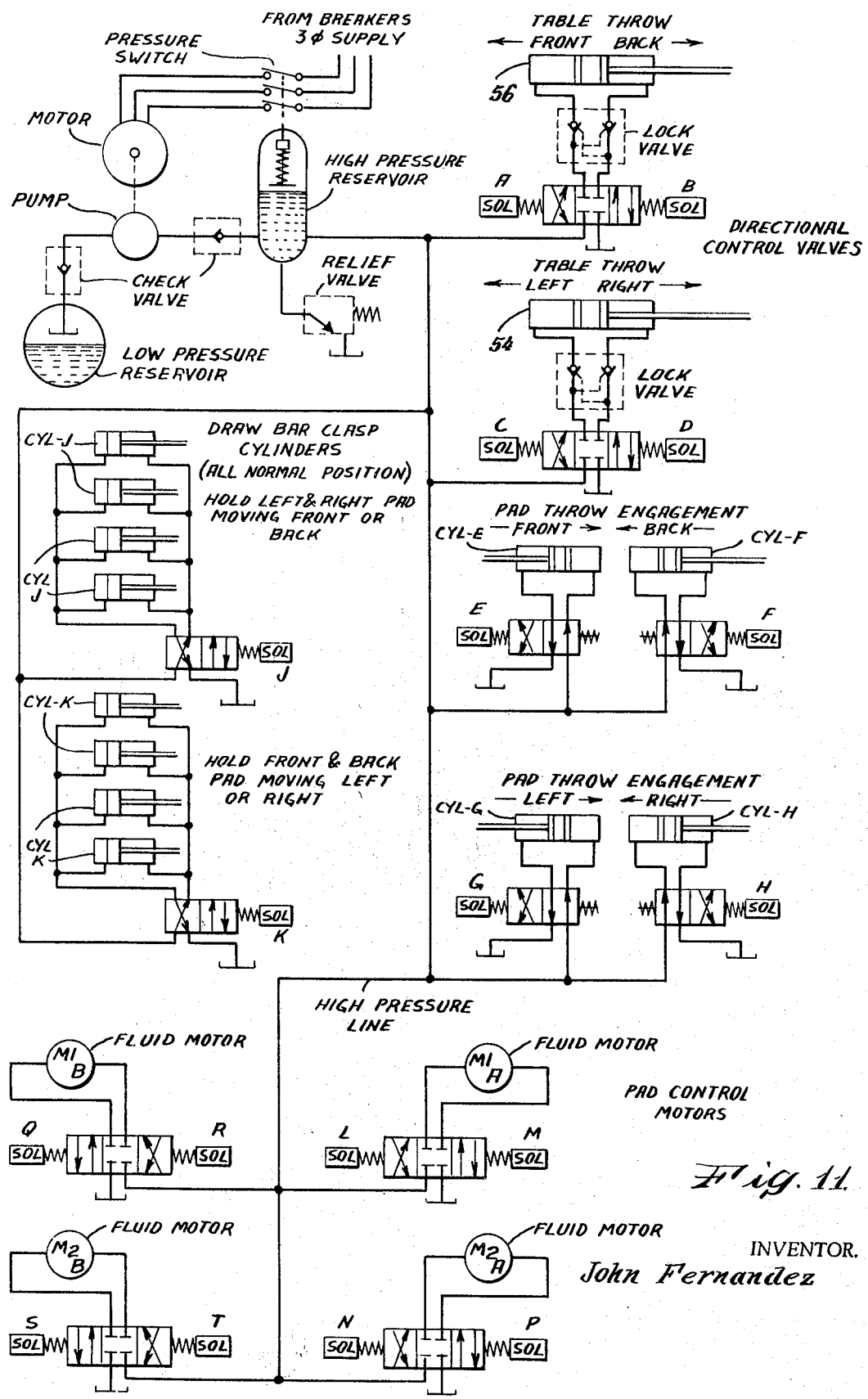
FIG. 11 is a schematic view of the hydraulic circuit and control means.

Referring now to FIG. 1 a load-supporting member or pad 10 is shown which may comprise a number of hinged together units 12 as shown in FIGS. 2 and 5. Alternatively the pad may be a single unitary pad 14 as indicated in FIG. 3. Either type of pad is provided with enlarged portions adapted to enter, and to slide longitudinally within, draw bars 18 in which the edge portions are received. As best seen in FIGS. 4 and 5 the draw bar members are substantially tubular but with their inner faces not completely closed leaving an opening through which the margins of the pad adjoining the enlarged edge portions extend and are free to slide when the pad is moving relative to the draw bar.

In the supporting member 10 shown in FIG. 2 the individual units 12 are provided along the edges with pins 20 and sockets 22 by which each unit is hingedly connected to each adjoining unit. Each unit is shaped centrally as at 24 (FIG. 5) to receive a ball bearing 26 which is held in place by a cover plate 28 which may be superimposed over the ball and attached in any suitable way to the unit as by rivets or spot welds indicated at 30.

Each unit which is disposed along a lateral edge of the pad 10 is formed along its lateral edge with an enlarged rodlike portion 32, which serves the same purpose as the enlarged edge portions 16 shown in FIG. 3, and is received in, and is longitudinally slidable within, a draw bar member 18.

For convenience the draw bars shown in FIG. 1 are identified respectively as 18a, 18b, and 18c, 18d. In FIG. 1 the pad 10 is shown disposed on, and slidable over, the top surface of a frame member 34 which is boxlike in that it is curved down from its top surface along all four sides of the top surface and is shaped to provide a bottom surface substantially parallel to its upper surface. The bottom may be discontinuous leaving a space through which access may be had to the interior of the boxlike structure.

The draw bars 18a and 18b are interconnected by flexible roller chain means indicated generally as F-1 which extend from the draw bars down around and under the boxlike frame 34 and are adapted to engage with the teeth of a sprocket. A horizontal shelf 36 (FIG. 4) is provided on which the slack portion of member F-1 may rest, and over which member F-1, and one of the draw bars, and a portion of the supporting pad 10, may be drawn when member F-1 is rotated to move the pad. The horizontal support member 36 is mounted at its four corners to the corner posts P which, besides forming the corners of the boxlike frame 34, also extend below the said frame and terminate in pedestals 38 which are longitudinally slidable within slideways defined by members 40, which in turn are slidable laterally within slideways defined by portions 42 of the base member 44, providing for sliding movement of the transfer means assembly in a plane at right angles of the sliding movement of the pedestal 38 within the slideway defining member 40.

Similarly the draw bars 18c and 18d are interconnected by flexible means indicated generally as F-2, which extend at right angles to flexible member F-1, and the slack intermediate portion of which is supported by, and slidable over, the horizontal shelf member 46, which as shown is disposed below shelf 36 and is also supported at its corners by means of the corner posts P.

Depending from shelf 46 are outwardly facings, opposed pairs of brackets 48, the lower ends 49 of which comprise bearing members which can slide longitudinally or laterally on the bearing surfaces 50 of the base 44, permitting the whole assembly to move relative to the base. Such movement is provided by the pistons of fluid cylinders 54 and 56 which are mounted respectively by one end to one of the longitudinally and one of the laterally facing brackets 48. The pistons 54a and 56a are connected to slides in the stationary center block 52 which projects up from the center of base 44.

As best seen in FIG. 1 the center block 52 defines two slideways 57 and 58, disposed at right angles to one another, and their respective pistons 54a and 56a are pivotally attached as by pin and clevis means to slide members 59 and 60 which are respectively disposed in said slideways.

When the piston 54a of cylinder 54 is projected or retracted the slide member 59 to which the piston 54a is attached cannot slide in its slideway 57 and therefore the cylinder itself is pushed or pulled and transmits this energy, through the bracket 48 on which it is mounted to the whole transfer assembly, with the result that the whole transfer assembly is moved or "thrown" a short distance laterally relative to the base, the direction of movement depending upon which side of the piston head the fluid pressure is applied, the fluid being delivered through the VALVE MANIFOLD (FIG. 10) within frame 34, and conduits such as conduit C, shown in FIG. 4, leading down through posts P to the space below shaft 46, between shelf 46 and portion 52 of the base.

Similarly when the piston 56a of cylinder 56 is projected or retracted the slide member 60 attached to the outer end of piston 56a will not be able to slide in its slideway 58 and cylinder 56 is either pulled or pushed and transmits the energy, through the bracket 48 on which it is mounted, with the result that the whole transfer assembly will be moved or "thrown" a short distance longitudinally, the direction of movement depending upon which side of the piston head the power fluid is supplied.

It will be noted that when the piston 54a of cylinder 54 is moved and the transfer assembly is accordingly moved laterally relative to the base, the slide member 60 attached to piston 56a projecting from cylinder 56 is free to slide in its slideway 58. Similarly when the piston 56a of cylinder 56 is actuated to move the transfer assembly longitudinally relative to the base the slide member 59 attached to the piston 54a of cylinder 54 is free to slide in its slideway 57.

When a load-supporting member or pad 10 or 16 is being moved in one direction its enlarged edges 16 or 32 may move entirely through the pair of draw bars 18 which are disposed along its lateral edges, thus completely disengaging the pad from that pair of draw bars, and in order to provide support for the draw bars when this occurs a reciprocal "clasp" or "grab" member 64 is provided for each draw bar. Each member 64 moves first upwardly and then forwardly behind a draw bar thus clasping it and holding it in position so that it will remain in alignment with the opposed edge portion of the pad and when the pad is rotated back toward its initial position its edge portions 16 or 32 which have moved through the opposed pair of draw bars will be aligned with the pair of draw bars and will reenter them. As shown in FIG. 5 each member 64 has a pin 66 intermediate its ends which is received in a slot 68 in a bellcrank member 70 which is pivoted intermediate its ends at 72. Pivot 72 is on slide 71 which slides in bracket 73. The lower end of bellcrank 70 is pivotally connected at 74 to a connecting rod 76 which is connected to and actuated by a piston rod in a cylinder J, shown in FIG. 10, and by which the bellcrank 70 is swung upwardly and slide 71 is moved forwardly, causing member 64 to move from a position below the upper surface of frame 34 to a position above 34 where it abuts against the rear side of the draw bar and its forwardly projecting flange 64a projects over the top of the draw bar thus clasping and holding the draw bar firmly in position. When the control rod 76 is moved in the opposite direction, as by actuation of the proper valve in the VALVE MANIFOLD shown in FIG. 10, this action is reversed and the member 64 is moved, first rearwardly out of contact with the draw bar, and then downward below the surface of member 34, the return movement of member 64 being facilitated by the spring member S which is placed under tension when the member 64 is moved into engagement with the draw bar.

The flexible roller chain means F-1 and F-2 are driven by drive means indicated in FIGS. 4, 5, 6 and 10. Two pairs of drive sprockets 82 are provided in connection with each pair of roller chains which comprise each means F-1 and F-2, for moving the supporting member or pad 10 in each of its two planes of movement, the two pair of drive sprockets being employed alternatively depending upon the direction in which it is desired to move the pad. When one pair of sprockets is engaged with F-1 or F-2 as the case may be for moving the pad in one direction in one of said planes, the other pair which is for moving the pad to the other direction in that plane, is disengaged from the flexible means.

Each drive sprocket 82 and the gears by which it is actuated are mounted upon a slide 84 which is disposed within a slideway defined by members 86 and 87 which as shown are brackets fastened to the vertically extending longitudinal or cross members 90 which are provided within the boxlike structure 34 to strengthen frame 34 and provide mounting means for the members disposed within frames 34.

Two slides 84 are provided along each side of frame 34 and the sprockets 82 carried thereby respectively are disposed in alignment with openings or slots 85 in the sides of frame 34, FIG. 1. Each pair of sprockets 82 is mounted on a drive shaft 83 which is rotatable by one of the fluid motors M-1-A, M-1-B, M-2-A, and M-2-B, and the shafts with the drive sprockets thereon are slidable, toward and away from an opposed pair of chains by operation of one of the fluid cylinders E, F, G or H as shown in FIG. 10. Each drive shaft 83 has at each end a bevel gear g-1 which meshes with another bevel gear g-2 mounted on a stub shaft 88 which extends through passage provided for it in the boss 89 at the center of a slide 84 and on its other end has another bevel gear g-3 which meshes with a bevel gear g-4 which is attached to and drives a sprocket 82. Gear g-4 and the sprocket are mounted on shaft 81 projecting from slide 84. The ends of drive shafts 83 extend through an opposed pair of slides 84 and so, when a pair of slides move the whole assembly including a drive shaft 83, the bevel gears g-1, g-2, stub shaft 88, the bevel gears g-3 and g-4, and the sprockets 82 associated with the slides move with them, the mounting vertical support 90 being cut away to give freedom of movement to the drive shaft.

When it is desired to move the pad, the slides 84 supporting the pair of sprockets 82 away from which the pad is to travel, are moved to engage their pair of sprockets with the roller chains comprising the aligned flexible means, F-1 F-2, and the slides carrying the other pair of sprockets 82 which are aligned with that flexible means are moved to disengage the sprockets they carry. This manner of driving the flexible chains insures long enough engagement between a pair of sprockets and the means F-1 and F-2 with which they are engaged to provide sufficient movement of the pad. If the pair of sockets toward which the pad is to be moved were employed, the travel of the pad would be limited by contact of the leading draw bar with the sprockets.

As indicated in FIG. 10 the hydraulic means for all operations other than the movement or throw of the transfer assembly relative to its base may be housed within the space provided by the boxlike member 34 and supported by suitable means on the vertical longitudinal and transverse members 90. FIG. 7 shows an additional fluid motor M-3 four of which may be provided within frame 34 and suitably connected to the VALVE MANIFOLD for operating means projecting from each corner post P for imparting power to conveyor means disposed in operative relation to the transfer assembly on any of its four sides. Each fluid motor M-3 acting through a chain of gears rotates a member 92 which is disposed within a bearing sleeve 94 extending through a frame corner post P. A single fluid motor M-s is shown (FIG. 7) and conduits t are indicated by which M-s may be connected to M-1-B for activating the member 92 which is at the front right-hand corner in FIG. 10. It is contemplated that when the transfer assembly is moved relative to its base toward a coacting conveyor the drive member 92 will engage with suitable means (not shown) associated with the conveyor and rotate the conveyor in a direction to receive a load from the pad of the transfer assembly or discharge a load onto the pad of the transfer assembly, FIGS. 8 and 9.

The hydraulic power system as shown in FIGS. 10 and 11 comprises a number of conduits in which the flow of power fluid is controlled by a series of solenoid valves disposed within the VALVE MANIFOLD, FIG. 10, and numbered A-T, FIG. 11, (the letters I and O not being employed). The solenoid valves may of course be controlled from a remotely positioned panel, not shown, and in FIG. 10 a cable 96 is indicated leading to the VALVE MANIFOLD in which may be disposed the ends of electric conductors for operating the solenoid valve individually.

The hydraulic fluid is supplied from the HIGH PRESSURE RESERVOIR in which the pressure is maintained by the HYDRAULIC PUMP and HYDRAULIC MOTOR. From the HIGH PRESSURE RESERVOIR the hydraulic fluid flows to the VALVE MANIFOLD, and in response to the operation of the solenoid valves it flows to the responsive fluid cylinders or motors, and, by movement of pistons therein in one or the other direction causes the movements enumerated below before returning to the LOW PRESSURE RESERVOIR:

To cylinders 54 or 56, (below shelf 46) for movement of the transfer assembly in either of four directions relative to its base;

To cylinders E and F or G and H for retracting one pair of sprockets 82 and their drive means while projecting the other pair of sprockets 82 and their drive means for driving either F-1 or F-2 in the desired direction to move the pad 10;

To fluid motors M-1-A or M-1-B, or M-2-A or M-2-B for driving the projected pair of drive sprockets either clockwise or counterclockwise;

To cylinders J or K for actuation of the side or the end clasping members or "grabs" 64; and To fluid motors M-3 (FIG. 7) for actuating any one of four power imparting means 92, adapted to mate with coactive means (not shown) carried by a member such as an endless conveyor onto which a load is to be transferred to the pad, to drive the conveyor.

The operation of the hydraulic system will be clear from the identification of the various fluid motors and cylinders appearing in FIG. 10, taken together with the following list of operations controlled by the solenoid valves indicated in FIG. 11;

A controls movement of the transfer assembly by cylinder 56 longitudinally of its base, in a direction to the right of the reader viewing FIG. 1;

B controls movement of the transfer assembly by cylinder 56 longitudinally of its base in a direction to the left of the reader viewing FIG. 1;

C controls movement of the transfer assembly by cylinder 54 transversely, to the left of the reader viewing FIG. 1;

D controls movement of the transfer assembly by cylinder 54 transversely, to the right of the reader;

E advances and retracts drive sprockets 82 driven by fluid motor M-1-A into and from engagement with flexible member F-1;

F retracts and advances the sprockets 82 driven by fluid motor M-1-B from and into engagement with the flexible member F-1;

G advances and retracts the sprockets 82 driven by fluid motor M-2-A into and from engagement with flexible member F-2;

H retracts and advances engagement of the sprockets 82 driven by fluid motor M-2-B from and into engagement with flexible member F-2;

J controls the cylinders J which through rods 76 actuate the clasp members or "grabs" 64 which engage and hold the draw bars 18c and 18d while the pad is displaced longitudinally relative to them;

K controls the cylinders K which through rods 76 actuate the clasp members or "grabs" 64 which engage the draw bars 18a and 18b while the pad is displaced laterally relative to them;

L controls fluid motor M-1-A for driving its drive shaft to rotate its drive sprockets 82 counterclockwise;

M controls fluid motor M-1-A for driving its drive shaft 83 to rotate its drive sprockets 82 clockwise;

N controls fluid motor M-2-A for driving its drive shaft 83 to rotate its drive sprockets 82 counterclockwise;

P controls the drive of fluid motor M-2-A for driving its drive shaft 83 to rotate its drive sprockets 82 clockwise;

Q controls the drive of fluid motor M-1-B for driving its drive shaft 83 to rotate its sprockets 82 counterclockwise;

R controls the drive of fluid motor M-1-B for driving its drive shaft 83 to rotate its sprockets 82 clockwise;

S controls the drive of fluid motor M-2-B for driving its drive shaft 83 to rotate its sprockets 82 counterclockwise;

T controls the drive of fluid motor M-2-B for driving its drive shaft 83 to rotate its sprockets 82 clockwise.

The transfer means disclosed herein has the advantage that it requires a minimum of space. It does not require space to turn around or maneuver in order to receive a load from one direction and deliver it in another direction. Any of its four sides may be presented to a surface from which a load is to be received, or onto which a load is to be transferred, thus greatly increasing its usefulness over prior art devices, such for example as a conventional conveyor which can operate in only one plane. There has thus been provided method and apparatus for accomplishing the above mentioned objects in an automatic and dependable way.

I claim:

1. Load transfer means including a rectangular support, a flexible pad movable as a unit over and partly around the support to receive a load and transport it to a position above and within the area defined by the support, and to discharge a load from a position above and within the area defined by the support, and means for moving the pad selectively in any one of four directions over the support and over the edge of the support and downwardly relative to the support surface a distance equal to the dimension of the support in the direction in which the pad is moved.

2. The assembly claimed in claim 1, in which the rectangular support is a boxlike frame, the means for moving the pad comprising a plurality of flexible means, and means for selectively moving the flexible means around any one of the four sides of the frame.

3. The assembly claimed in claim 2 including means for supporting the slack portion of the flexible means respectively disposed below the frame at different levels.

4. The assembly claimed in claim 2, in combination with a base on which the frame is supported, and means for selectively moving the pad and its supporting frame relative to the base in either direction along either of the planes of movement of the pad.

5. The assembly claimed in claim 2, including drive means for the flexible means disposed within said frame and means for projecting the drive means through openings in the frame into engagement with the flexible means.

6. Load transfer means including, a supporting surface and means for moving the supporting surface along an endless path in any of four directions, a plurality of flexible means, and drive means therefore for selectively moving the supporting surface in either direction along either of two intersecting paths, each of said flexible means having at its ends means engageable with edge portions of the supporting surface, the engagement being such that when the supporting surface is moving with one of said flexible means it is slidingly related to the other of said flexible means.

7. The assembly claimed in claim 6, including means for clasping the means at the end of a flexible means when the supporting surface has moved out of the said means at the end of a flexible means.

8. Load transfer means including, a supporting surface and means for moving the supporting surface along an endless path in any of four directions, means for selectively moving the supporting surface with either of a plurality of flexible means for movement in either direction along either of two intersecting paths, each of the flexible means having at its end normally disposed members and the supporting surface having means along its edges adapted to engage with a pair of said members for movement of the supporting surface and one of the flexible means along one path and to slide relatively to said pair of members for movement of the supporting surface and the other of said flexible means along another path.

9. The assembly claimed in claim 8, in which the normally disposed members are tubular members which are partially open on their opposed faces providing slots through which the edges of the supporting surface extend, and the supporting surface has edge portions adapted to be received axially in the opposed pairs of tubular members respectively.

10. The assembly claimed in claim 8 in which the normally disposed members are tubular members which are partially open on their opposed faces providing slots through which the edges of the supporting surface extend, and the supporting surface has edge portions adapted to be received axially in the opposed pairs of tubular members respectively, and means for engaging and holding in place a pair of said substantially tubular members while they are disengaged from the supporting surface, and means for actuating said means.

11. The assembly claimed in claim 8, including means for driving said flexible members selectively in either direction, the relationship between the pairs of tubular members and the pairs of enlarged edge portions of the supporting surface being such that as the supporting surface is moved along one path and is coacting with one of said flexible members to form an endless member it is moving relative to the other of said flexible members which remains stationary and its enlarged edge portions which are opposed to the substantially tubular members which are at the ends of the other flexible member move axially within and through the tubular members which are at the respective ends of the other flexible member.

12. The assembly claimed in claim 6, including a frame around which the flexible means travel, in which clasping means are disposed within said frame and means are provided for reciprocating the clasping means through openings provided in the frame and sliding them forwardly and back between an at rest position within the frame and an operative position in which the clasping means engage and hold a pair of the same means at the ends of a flexible means.

UNITED STATES PATENT OFFICE
CERTIFICATE OF CORRECTION

Patent No. 3,557,931　　　　　　　　　Dated January 26, 1971

Inventor(s) John Fernandez

It is certified that error appears in the above-identified patent and that said Letters Patent are hereby corrected as shown below:

Column 1, line 66, after "employed" insert -- for operati[ng] the transfer assembly may be also employed --. Column 2, line [4] "used" should read -- the --; line 17, after "load-carrying" insert -- means --. Column 4, line 15, before "outwardly" ins[ert] -- the --; line 29, after "clevis means" insert -- 62 --; lin[e] 42, "shaft" should read -- shelf --. Column 8, line 27, "end" should read -- ends --; line 68, "same" should read -- said --

Signed and sealed this 29th day of June 1971.

(SEAL)
Attest:

EDWARD M. FLETCHER, JR.　　　　　　　　　WILLIAM E. SCHUYLER,
Attesting Officer　　　　　　　　　　　　Commissioner of Patent[s]